(12) United States Patent
Macknik et al.

(10) Patent No.: US 8,373,106 B2
(45) Date of Patent: Feb. 12, 2013

(54) METHOD OF DETECTING AND CONTROLLING PERCEPTUAL FLICKER

(75) Inventors: Stephen L. Macknik, Anthem, AZ (US); Susana Martinez-Conde, Anthem, AZ (US)

(73) Assignee: Dignity Health, Phoenix, AZ (US)

( * ) Notice: Subject to any disclaimer, the term of this patent is extended or adjusted under 35 U.S.C. 154(b) by 674 days.

(21) Appl. No.: 12/593,816

(22) PCT Filed: Oct. 18, 2007

(86) PCT No.: PCT/US2007/022211
§ 371 (c)(1),
(2), (4) Date: Sep. 29, 2009

(87) PCT Pub. No.: WO2008/123865
PCT Pub. Date: Oct. 16, 2008

(65) Prior Publication Data
US 2010/0037373 A1    Feb. 18, 2010

Related U.S. Application Data

(60) Provisional application No. 60/949,143, filed on Jul. 11, 2007, provisional application No. 60/921,959, filed on Apr. 5, 2007.

(51) Int. Cl.
*G01J 1/32* (2006.01)
*G05F 1/00* (2006.01)
*F21V 7/04* (2006.01)

(52) U.S. Cl. .......... 250/205; 315/291; 362/611

(58) Field of Classification Search .......... 250/215, 250/216, 205, 552–554; 353/29, 85; 315/209, 315/210, 224, 291, 294, 307, 312; 362/227, 362/219, 251, 555, 611–614
See application file for complete search history.

(56) References Cited

U.S. PATENT DOCUMENTS

| | | | | |
|---|---|---|---|---|
| 3,621,838 A * | 11/1971 | Harding | .......... | 607/90 |
| 4,324,460 A | 4/1982 | Daley | | |
| 6,150,659 A * | 11/2000 | Baliga et al. | .......... | 250/339.15 |
| 7,119,815 B1 | 10/2006 | Cahill, III | | |
| 7,202,852 B2 * | 4/2007 | Harvie | .......... | 345/158 |
| 7,614,750 B2 * | 11/2009 | May et al. | .......... | 353/29 |
| 2003/0184661 A1 * | 10/2003 | Yubata et al. | .......... | 348/229.1 |
| 2005/0168492 A1 | 8/2005 | Hekstra et al. | | |
| 2005/0231620 A1 | 10/2005 | Fraenkel et al. | | |
| 2005/0242756 A1 | 11/2005 | Honbo | | |
| 2006/0245174 A1 | 11/2006 | Ashdown et al. | | |

FOREIGN PATENT DOCUMENTS

JP    2005 038815    2/2005

OTHER PUBLICATIONS

PCT Notfcaton of Transmtal of the International Seach Report and the Written Opinion of the International Searching Authority, or the Declaration, Apr. 8, 2008, (8 pages).
European Search Report, Appln. No. 07861433.6; 9 pages, dated May 26, 2010.

* cited by examiner

*Primary Examiner* — Georgia Y Epps
*Assistant Examiner* — Don Williams
(74) *Attorney, Agent, or Firm* — Husch Blackwell LLP

(57) ABSTRACT

A method and apparatus are provided for processing light from a light source. The method includes the steps of measuring a predetermined set of characteristics of the light source and detecting flicker when the predetermined set of characteristics exceed a corresponding flicker fusion threshold value.

24 Claims, 2 Drawing Sheets

METHOD OF DETECTING AND CONTROLLING PERCEPTUAL FLICKER

FIELD OF THE INVENTION

The field of the invention relates to visual stimulation and more particularly to the effects of visual stimulation on a person's brain.

BACKGROUND OF THE INVENTION

Many devices that produce artificial light do so on a discontinuous basis. For example, incandescent or fluorescent lights produce light from an alternating current power source that operates at 50-60 cycles per second (Hz). In most cases, the artificial light produced by such devices appears to most people to be uninterrupted, continuous light.

In some cases, the devices that produce such light may begin to malfunction and produce a noticeable flicker, such as for example, a fluorescent light. A malfunctioning fluorescent light that flickers, however, is only a minor irritation to most people.

Similarly, television sets, video games and movies operate by dividing images into a series of image frames that are presented to a viewer at a predetermined frame rate. In the case of television, the frame rate is 30 frames per second.

In order to reduce any flicker and to produce the effect of a more continuous image, television sets use a concept called interleave scanning. Under interleave scanning, a television set divides the screen into odd and even horizontal lines. To present an image, a controller of the television presents a first image on the odd lines followed by a second image on the even lines followed by a third image again on the odd lines and so on.

In general, most people are not able to process information fast enough to perceive the changing images. In most cases, the inability of the human visual system to process high speed optical signals operates effectively, to make such changing optical signals appear to be a continuous image.

However, some visual images are not always perceived as continuous. For example, equipment malfunction, laser battles between players in video games or even explosions in movies can cause severe neural disruptions in some people, leading to headaches and, in some cases, epileptic seizures. Because of the dangerous health effects, a need exists for a method of avoiding the effects produced by such images or series of images.

SUMMARY

A method and apparatus are provided for processing light from a light source. The method includes the steps of measuring a predetermined set of characteristics of the light source and detecting flicker when the predetermined set of characteristics exceed a corresponding flicker fusion threshold value.

In another aspect, the predetermined set of characteristics further includes a frequency of light output from the light source and a duty cycle.

In another aspect, the corresponding flicker fusion value further comprise a lower frequency threshold of 15 Hertz with a 90% duty cycle and an upper frequency threshold of 120 Hertz with 10% duty cycle.

In another aspect, the method includes adjusting a frequency or duty cycle of the light from the light source to cause flicker fusion.

In another aspect, the method includes blocking the light from the light source when flicker is detected.

In another aspect, the method includes defining the light source as a video signal.

In another aspect, the method includes providing a warning when the flicker exceeds the flicker fusion threshold value.

DETAILED DESCRIPTION OF AN ILLUSTRATED EMBODIMENT

Every day billions of people worldwide operate under flickering artificial lighting conditions, or observe flickering computer/TV displays and/or cinematic pictures. Given the number of people who rely on artificial lighting conditions, advances leading to even modest gains of function in people who are extremely sensitive to flicker has a significant impact. Although flickering optical stimuli above some threshold may be visible to high speed optical detectors for only a fraction of any time period, they appear as continuous and stable to humans because we perceptually integrate successive flashes in a process called "flicker fusion" (FF). However, physiological evidence in humans and monkeys show that flicker rates above the perceptual critical flicker frequency (CFF) threshold can nevertheless generate cortical and subcortical visual responses. Thus the temporal integration underlying FF does not occur at the level of the retina, but takes place later in the visual hierarchy.

It has been found that for two brief-duration visual targets presented in close succession, the after-discharge from the first target may interfere with or inhibit the onset-response from the second target (i.e., mutual suppression). In this case, the target may be a flash of light or some other visual stimuli. In preliminary experiments, the effects of inhibition at the termination of the first stimulus has been studied by presenting the stimulus twice, with varied intervals between the first and second presentations. It has been found that with short inter-stimulus intervals, both the after-discharge of the first stimulus, and the onset-response of the second stimulus, were inhibited.

The research establishes that when FF occurs perceptually, it is due to the lack of robust firing of various neural elements in response to the subsequent flickering stimulus (which, in a sense, is caused by the stimulus forwardly and backwardly masking itself). The duration of the inhibitory effect on perceiving subsequent flashes after the first flash coincided in time and had the same duration as the time-out period of the first flash.

Figure 1:
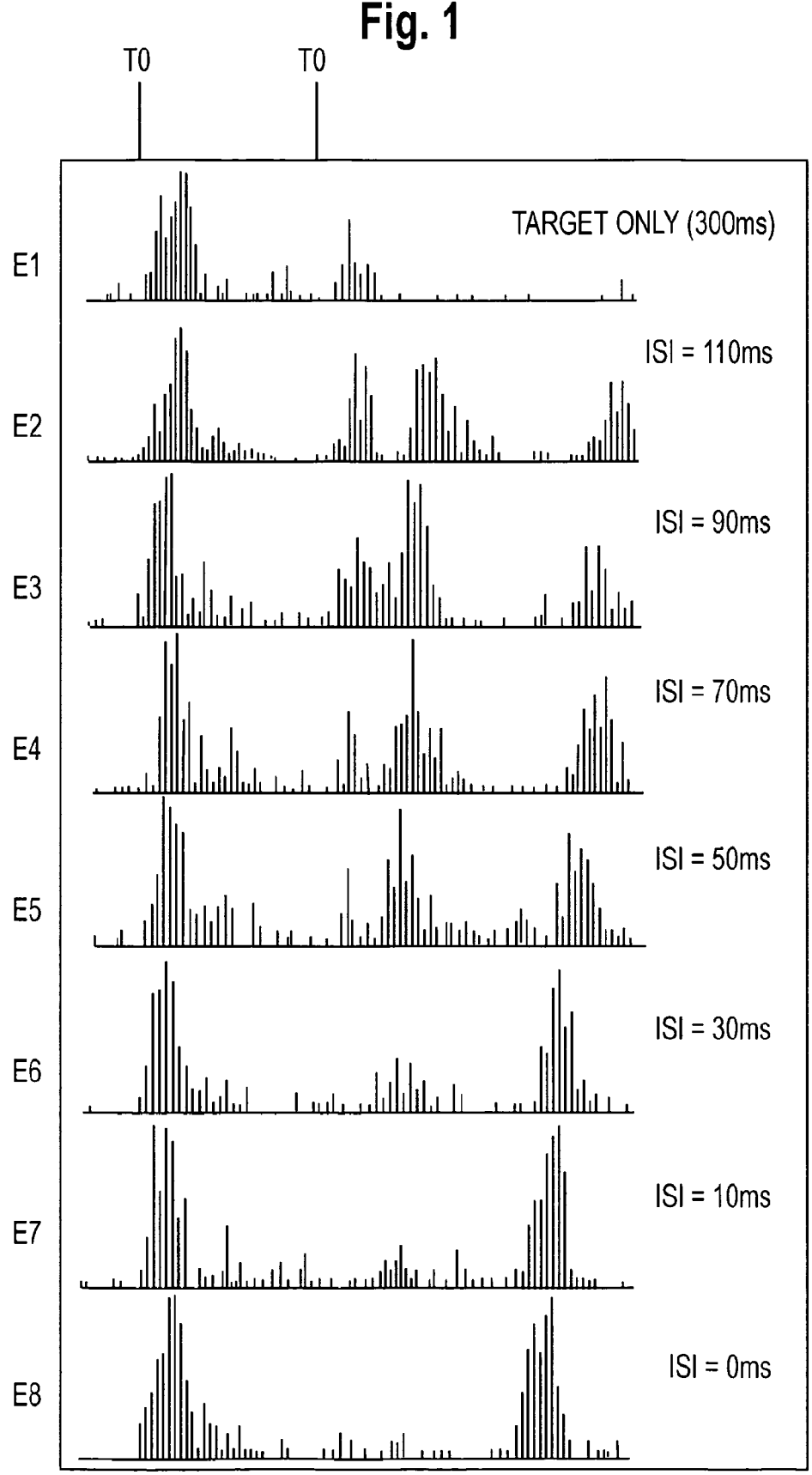
FIG. 1 depicts a set of timing charts that depict flicker fusion threshold values under an illustrated embodiment of the invention.

FIG. 1 shows the effect of the inhibitory effect on subsequent flashes. More specifically, FIG. 1 shows a series of electrical activity recordings from upper neural layers of area V1 in a rhesus monkey in response to light flashes with various inter-stimulus intervals (ISIs).

The top trace, E1, beginning at time T0, shows the electrical response to the stimulus flashing once, while, the other traces, E2-8, show the electrical responses to a double flash of varying ISIs (i.e., the first flash beginning at time T0 and the second flash beginning at time T1). FIG. 1 shows that the onset-response to the second flash (i.e., flicker fusion) only occurs with ISIs of 30 msec or less (equivalent to 33 Hz periodic). If the flashes are separated by more than 30 msec, the after-discharge of the first flash and the onset-response of the second flash begin to recover (i.e., equivalent to <33 Hz flicker). These intervals roughly coincide with the CFF threshold in humans for 100% contrast stimuli in the fovea (in contrast to the monkeys used in the preliminary studies discussed above).

It has also been found that the duration or duty cycle (i.e., the ratio of ON to OFF time) of the flash also has a profound effect upon flicker fusion. In one embodiment, the flicker fusion threshold extends from a lower frequency threshold boundary (e.g., 15 Hz with a 90% duty cycle) to an upper frequency threshold boundary (e.g., 120 Hz with a 10% duty cycle). In this case, the lower threshold would be equivalent a light flash lasting approximately 60 msec with an interval between flashes of 6 msec and the upper threshold would correspond to a light flash lasting 0.8 msec with an interval between flashes of 80 msec.

In other embodiments, the lower frequency threshold value approaches 0 Hz with a duty cycle that approaches 100%. Similarly, the upper frequency threshold lies above 120 Hz with a duty cycle that approaches 0%.

Flickering is a problem on any of a number of light emitting devices (e.g., in light bulbs, televisions, computers, etc.). As demonstrated above, when the varying output of a light source exceeds some limit, the visual hierarchy of a human subject's brain fuses the varying light output into the perception of a continuous light in a process called flicker fusion.

Flicker fusion can be ensured in lighting or emitting devices by reducing the duration of dark intervals between light intervals. Tie critical frequency is between the lower frequency threshold value and the upper frequency threshold value. Flicker fusion with a 50% duty cycle and at normal photopic lighting levels typically occurs automatically above about 33 Hz. However, flicker fusion may be accomplished at any frequency below 33 Hz by adjusting a duty cycle of light emission towards an upper limit.

The description provided below supports the creation of a new generation of light emitting devices without perceptible flicker. In fluorescent devices (e.g., lights), flicker fusion may be accomplished by choosing fluorescent coatings that spread out the light emitting interval over a greater portion of the on-off cycle. In electric discharge or incandescent lighting, flicker fusion may be accomplished by rectifying the alternating current power supply and applying direct current to the lighting device. In the case of LEDs, including those used to illuminate video monitors, flicker fusion may be accomplished with simple filters connected across the terminals of the LED. In cathode ray tubes (CRTs), or conventional televisions, the dwell time of the electron beam can be increased at each pixel, without necessarily increasing the frame rate. Flicker fusion may also be accomplished by adding lower level light pulses between light pulses.

In its simplest form, flicker fusion can be accomplished in incandescent bulbs by simply supplying the bulbs from either a direct current power supply or an alternating current power supply that operates with an appropriate flicker rate/duty cycle combination. Since most incandescent bulbs operate from 60 Hz power, this would equate to ensuring that the duty cycle is somewhere above 10%. Alternatively, a resistor-capacitor network may be connected across the light bulb that reduces the peak voltage, but also increases the duration of the light pulse produced by the incandescent light.

Figure 2:
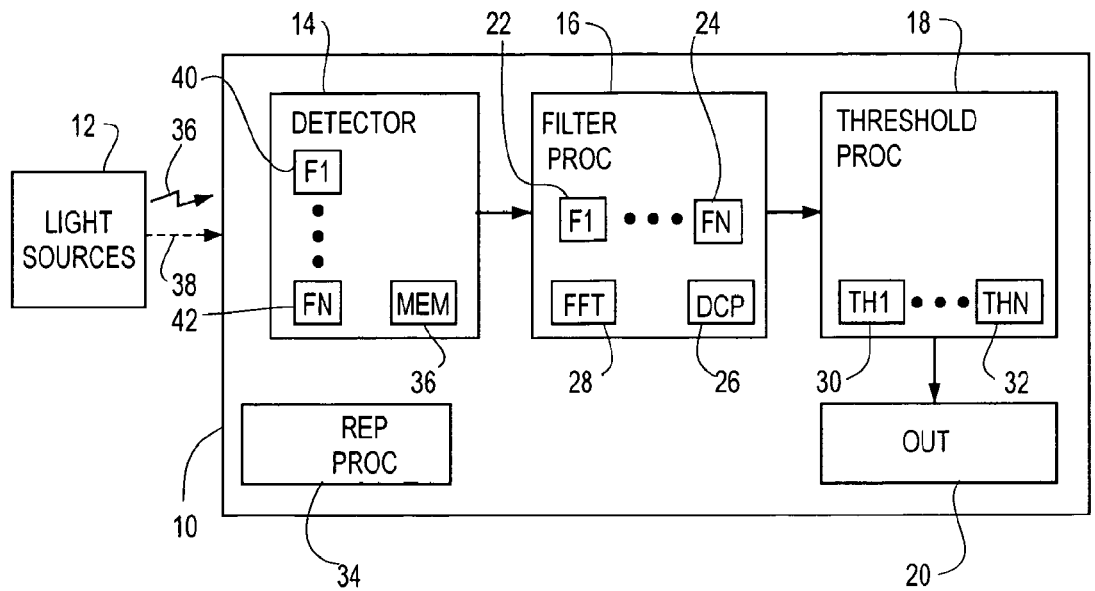
FIG. 2 depicts a flicker detector that uses the threshold values of FIG. 1.

FIG. 2 shows a flicker detector 10 shown generally in accordance with an illustrated embodiment of the invention. The flicker detector 10 may include a signal detector 14, a filter processor 16, a threshold processor 18 and an output 20.

The signal detector 14 may detect optical stimulus under a number of different formats. Under a first format, the flicker detector 10 may be a portable device carried by a safety inspector (e.g., an OSHA inspector) into the work place to detect harmful flicker. In this case, the signal detector 14 may include a photodiode to detect optical signals 36 from lights, video equipment or other industrial processing equipment emitting optical signals into the workplace.

The filter processor 16 may include one or more filters 22, 24 that identify optical energy lying below the flicker fusion thresholds. One set of filters 22, 24 may isolate the amount of optical energy within each of a number of different frequency ranges between the lower frequency threshold boundary and the upper frequency threshold boundary. A duty cycle processor 26 within the filter processor 16 may determine a duty cycle by determining a ratio of ON/OFF time for the signal in each corresponding frequency range between the lower and upper frequency threshold boundaries.

Alternatively, the filter processor 16 may also determine the frequency distribution and duty cycle using a Fast Fourier Transform. In this case, the frequency and duty cycle can be determined directly from the location and breadth of any peaks on a calculated FFT distribution scale between the lower and upper frequencies of the threshold boundary.

The threshold processor 18 may receive the frequencies and duty cycles of any detected signals received from the filter processor 16 and perform a set of comparisons with one or more threshold values 30, 32. The one or more threshold values 30, 32 may simply be some single minimum value below which the flicker fusion threshold may not bother most sensitive people. Alternatively, the one or more threshold values 30, 32 may be different for each frequency range between the upper and lower frequency threshold boundaries.

If the detected signals exceed one or more threshold values 30, 32 (thereby indicating flicker), then the flicker detector 10 provides an output 20. The output 20 may be an audible alarm or a meter reading. Where the output 20 is a meter reading, the meter reading may be a relative value of the optical energy that exceeds the flicker fusion threshold.

Figure 3:
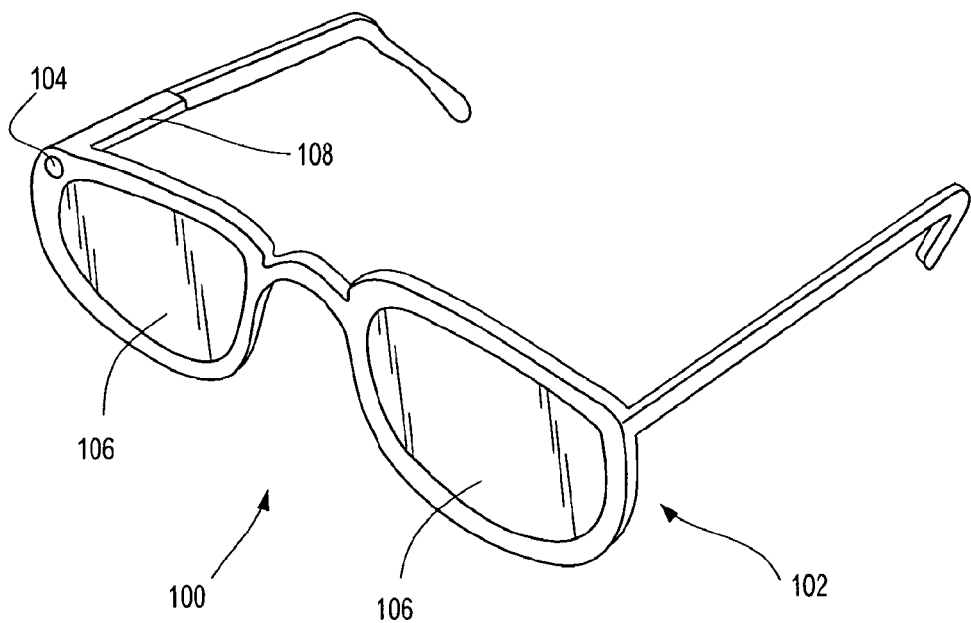
FIG. 3 depicts goggles or spectacles that use the flicker detector of FIG. 2.

In another embodiment, the flicker detector 10 may be incorporated into a set of goggles or spectacles 100, as shown in FIG. 3. In this case, the flicker detector circuit 10 of FIG. 2 is incorporated into a frame 102 of the goggles or spectacles 100. The signal detector 14 of FIG. 2 is replaced with a photodiode 104 disposed adjacent a set of lens 106. The filter processor 16 and threshold processor 18 of FIG. 2 are disposed within a housing 108 and the output 20 is coupled to the lens 106.

In order to protect the wearer of the goggles or spectacles 100, the lenses 106 have the ability to block flickering light. In this respect, the blocking lenses 106 may be fabricated with ferromagnetic liquid crystal display (LCD) shutters either incorporated into and provided as an integral part of the lens or provided as a coating over the lens. As is known, a ferromagnetic LCD shutter has 3 log units of control of extinction (opacity) and can shutter in approximately 12 microseconds.

In use, the goggles or spectacles 100 are worn by a user in a normal manner. The lenses may also be provided as prescription lenses. The photodiode 104 continually monitors and detects any light signals impinging upon the goggles or spectacles 100. The detected signals are first filtered within the filter processor 16 to identify a frequency content and duty cycle contained within the signals. The frequency content and duty cycles are compared with the thresholds by the threshold processor 18. If the identified frequency content and duty cycle of any signal exceeds the one or more threshold values, then the threshold processor 18 may activate the blocking lens 106 to block any flicker from impinging upon the eyes of the wearer.

The blocking lens 106 may operate under any of a number of different modes. For example, if the flicker processor 10 within the goggles or spectacles 100 detects flicker, then the blocking lens 106 may close for some time period (e.g, 10 second) or until the user turns his head away from the flicker source. Alternatively, a repetition processor 34 within the flicker detector 10 may determine a repetition rate of the flicker and activate the blocking lens 106 at a repetition rate coincident with the flashes to allow the user at least some limited vision while blocking the harmful flicker.

In another embodiment, the flicker detector 10 may be used to evaluate the safety of movies, video games or other prerecorded video signals. In this case, the signal detector 14 may receive the video under an appropriate format (e.g., jpeg, mpeg, radio frequency, etc.) through a hard-wired or optical connection 38.

Upon receipt of the signals, the signals detector 14 may form a series of video frames within a memory 36. The signal detector 14 may then compare pixels among frames to identify the rate of change of intensity values for the pixels among a sequence of frames. To reduce the computational burden, the detection processor may identify those pixels in each frame above a threshold value and over some time period to identify the pixels with the greatest variability and save a sequence of those pixels into a respective file 40, 42 along with a time indicator of a source frame. The files 40, 42 may, in turn, be transferred to the filter processor 16.

The filter processor 16 may apply the filters 22, 24 to each file 40, 42 and among the files to identify flicker in any one location within the frames or flicker that manifests itself across multiple locations within the frames. It should be noted in this regard that the frame rate or time differences of the respective frames provide the time base for determining the frequency of the pixel changes and duty cycle of the pixel changes. The intensity values of the pixels provides the energy values for comparison with the respective thresholds.

The determined frequencies, duty cycles and energy values may, in turn, be transferred to the threshold processor 18. Within the threshold processor 18, the determined frequencies, duty cycles and energy values may be compared with the respective thresholds of the flicker fusion thresholds to determine if the video is safe for flicker sensitive people to watch.

The output 20 provided by the threshold processor 18 may simply be a value indicating a rejection or acceptance. Alternatively, the output may be a time log of frames that may need to be deleted to make the video safe for flicker sensitive people.

In another alternative, the flicker detector 10 may be incorporated into flicker producing devices to reduce flicker at the source. For video devices (e.g., television sets, computer monitors, etc.), the flicker detector 10 may receive a video input for direct processing. Where flicker is detected, the flicker detector 10 may simply forward a pixel location and frame identifier to a controller of the video device. In response, the controller may reduce the intensity level of the pixel to some minimal threshold level or simply delete the offending frames.

In the case of lighting devices, the flicker detector 10 may operate differently. For example, in light dimming circuits, the flicker detector 10 may simply block any reduction in dimming once flicker is detected. In lighting fixtures without such controls, the flicker detector 10 may simply deactivate the fixture.

A specific embodiment of method and apparatus for detecting flicker has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing light from a light source comprising:
    measuring a predetermined set of characteristics of the light source including at least the frequency of light output from the light source and the duty cycle of the light output;
    identifying a flicker fusion threshold corresponding to the light source based upon the measured frequency or duty cycle of the light source; and
    detecting flicker when the measured frequency and duty cycle of the predetermined set of characteristics exceed a respective frequency and duty cycle of the identified corresponding flicker fusion threshold value.

2. The method of processing the light source as in claim 1 wherein the corresponding flicker fusion value further comprise a lower frequency threshold of 15 Hertz with a 90% duty cycle and an upper frequency threshold of 120 Hertz with 10% duty cycle.

3. The method of processing light as in claim 1 further comprising adjusting a frequency or duty cycle of the light from the light source to cause flicker fusion.

4. The method of processing the light source as in claim 1 further comprising blocking the light from the light source when flicker is detected.

5. The method of processing light as in claim 1 further comprising defining the light source as a video signal.

6. The method of processing light as in claim 1 further comprising providing a warning when the flicker exceeds the flicker fusion threshold value.

7. An apparatus for processing light from a light source comprising:
    a Fourier processor that measures a frequency and duty cycle of periodic fluctuations in a light output from of the light source; and
    a threshold processor that identifies a flicker fusion threshold value corresponding to the measured frequency or duty cycle from a predetermined set of flicker fusion threshold values and where the threshold processor detects flicker when the measured frequency and duty cycle exceed a frequency and duty cycle of the corresponding flicker fusion threshold value.

8. The apparatus for processing the light source as in claim 7 wherein the predetermined set of flicker fusion values further comprise a lower frequency threshold of 15 Hertz with a 90% duty cycle and an upper frequency threshold of 120 Hertz with 10% duty cycle.

9. The apparatus for processing light as in claim 7 further comprising a filter added to the light source where the light source is an incandescent device to adjust a duty cycle of the light from the light source to cause flicker fusion.

10. The apparatus for processing the light source as in claim 9 further comprising defining the apparatus as an OSHA testing device.

11. The apparatus for processing the light source as in claim 9 further comprising defining the light source as a video signal.

12. The apparatus for processing the light source as in claim 7 further comprising a light blocking device that blocks the light from the light source.

13. The apparatus for processing the light source as in claim 12 further comprising defining the apparatus as a set of goggles or spectacles and the light blocking device as a liquid crystal display lens that blocks the light from the light source upon detection of flicker.

14. A pair of goggles or spectacles for protecting a user from flicker comprising:
a sensor that detects light impinging upon the apparatus;
a Fourier processor that detects a frequency and a duty cycle of the detected light;
a threshold processor that identifies a flicker fusion threshold value corresponding to the detected frequency or duty cycle from a predetermined set of flicker fusion threshold values;
a comparator that compares the detected frequency and duty cycle with the frequency and duty cycle of the identified flicker fusion threshold value and
a lens that blocks impinging light when flicker is detected.

15. The pair of goggles or spectacles as in claim 14 wherein the lens further comprise a liquid crystal display.

16. The pair of goggles or spectacles as in claim 14 wherein the flicker fusion threshold values further comprise a lower threshold of 15 Hz and an upper threshold of 120 Hz.

17. A flicker detector comprising:
an optical sensor;
a plurality of filters that each pass optical signals within a different frequency range between an upper and lower flicker fusion frequency threshold;
a threshold processor that determines a duty cycle of the optical signals within the frequency range of each of the plurality of filters and detects flicker when an output of at least one of the plurality of filters exceeds a respective flicker fusion duty cycle threshold value that corresponds to the flicker fusion frequency threshold of the filter; and
a warning indicator that provides indication to a user when flicker has been detected.

18. A method of processing light from a light source comprising:
measuring at least the frequency of light output from the light source and the duty cycle of light output from the light source;
identifying a flicker fusion threshold corresponding to the light source based upon the measured frequency or duty cycle of the light source;
detecting flicker when the measured frequency and duty cycle of the light source exceed a respective frequency and duty cycle of the identified flicker fusion threshold; and
adjusting a frequency or duty cycle of the light from the light source to cause flicker fusion.

19. The method of processing the light source as in claim 18 wherein the predetermined level of flicker further comprises a lower frequency threshold of 15 Hertz with a 90% duty cycle and an upper frequency threshold of 120 Hertz with 10% duty cycle.

20. The method of processing the light source as in claim 18 wherein the step of adjusting a frequency or duty cycle further comprises blocking the light from the light source.

21. The method of processing the light source as in claim 18 wherein the step of blocking the light further comprises providing a lens to protect the eyes of a viewer of the light source.

22. The method of processing the light source as in claim 18 wherein the step of measuring the light source further comprises determining a frequency content of the light source.

23. The method of processing the light source as in claim 22 wherein the step of measuring the light source further comprises determining a duty cycle of the light source.

24. The method of processing the light source as in claim 18 wherein the step of determining the frequency content of the light source further comprises comparing the determined frequency and duty cycle with a threshold value.

* * * * *